United States Patent
Ollivier et al.

(10) Patent No.: US 7,941,407 B2
(45) Date of Patent: May 10, 2011

(54) ORGANIZATION OF ARCHIVAL ELEMENTS FOR ANALOG/DIGITAL HYBRID DATA ON FILM

(75) Inventors: Pierre Ollivier, Culver City, CA (US); James Fancher, Marina del Rey, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 548 days.

(21) Appl. No.: 11/921,607

(22) PCT Filed: May 24, 2006

(86) PCT No.: PCT/US2006/020191
§ 371 (c)(1),
(2), (4) Date: Dec. 5, 2007

(87) PCT Pub. No.: WO2007/001698
PCT Pub. Date: Jan. 4, 2007

(65) Prior Publication Data
US 2009/0210460 A1 Aug. 20, 2009

Related U.S. Application Data

(60) Provisional application No. 60/694,611, filed on Jun. 27, 2005.

(51) Int. Cl.
*G06F 7/00* (2006.01)
(52) U.S. Cl. .................................. 707/667; 396/311
(58) Field of Classification Search ........................ None
See application file for complete search history.

(56) References Cited

U.S. PATENT DOCUMENTS

| | | | |
|---|---|---|---|
| 4,665,004 | A | 5/1987 | Drexler |
| 5,227,783 | A | 7/1993 | Shaw et al. |
| 5,241,472 | A | 8/1993 | Gur et al. |
| 5,574,577 | A | 11/1996 | Wally et al. |
| 5,694,316 | A | 12/1997 | Azancot |
| 5,751,398 | A | 5/1998 | Beard |
| 5,757,357 | A | 5/1998 | Grande et al. |
| 5,920,317 | A | 7/1999 | McDonald |
| 5,929,870 | A | 7/1999 | Takeuchi |
| 6,005,513 | A | 12/1999 | Hardesty |
| 6,081,576 | A | 6/2000 | Schanen et al. |
| 6,115,035 | A | 9/2000 | Compton et al. |

(Continued)

FOREIGN PATENT DOCUMENTS

EP 0131095 3/1986

(Continued)

OTHER PUBLICATIONS

International Search Report, dated Dec. 1, 2006.

*Primary Examiner* — Charles Rones
*Assistant Examiner* — Belix M Ortiz
(74) *Attorney, Agent, or Firm* — Robert D. Shedd; Robert B. Levy; Jeffrey D. Hale

(57) ABSTRACT

A system and method for archiving films includes dividing a film feature into N parts. Metadata is digitally stored on each of the N parts of film. The film includes both analog and digital data representing an entire record of the film on a single media for at least one N part. For each N part, the single media may include all the color component images associated with that part.

18 Claims, 3 Drawing Sheets

U.S. PATENT DOCUMENTS

| | | | |
|---|---|---|---|
| 6,122,239 A | 9/2000 | Bodo et al. | |
| 6,180,312 B1 | 1/2001 | Edwards | |
| 6,402,037 B1 | 6/2002 | Prasad et al. | |
| 6,501,911 B1 * | 12/2002 | Malloy Desormeaux | 396/311 |
| 6,678,764 B2 | 1/2004 | Parvulescu et al. | |
| 6,701,184 B2 | 3/2004 | Henkin | |
| 6,771,878 B1 | 8/2004 | Caramico et al. | |
| 6,886,047 B2 | 4/2005 | Leong et al. | |
| 6,934,467 B1 | 8/2005 | Herz | |
| 2002/0094787 A1 | 7/2002 | Avnet et al. | |
| 2002/0131768 A1 | 9/2002 | Gammenthaler | |
| 2002/0154691 A1 | 10/2002 | Kost et al. | |
| 2002/0186957 A1 | 12/2002 | Yuen | |
| 2004/0201765 A1 | 10/2004 | Gammenthaler | |
| 2005/0063005 A1 | 3/2005 | Phillips et al. | |
| 2005/0071093 A1 | 3/2005 | Stefan | |
| 2006/0047967 A1 * | 3/2006 | Akhan et al. | 713/176 |

FOREIGN PATENT DOCUMENTS

| | | |
|---|---|---|
| EP | 0724192 | 7/1996 |
| EP | 0666495 | 6/1999 |
| EP | 0850477 | 4/2004 |
| JP | 01292333 | 11/1989 |
| WO | WO9214239 | 8/1992 |
| WO | WO9966728 | 12/1999 |
| WO | WO0054507 | 9/2000 |
| WO | WO0072186 | 11/2000 |
| WO | WO0120906 | 3/2001 |
| WO | WO0133921 | 5/2001 |
| WO | WO0139192 | 5/2001 |
| WO | WO0152000 | 7/2001 |
| WO | WO0154394 | 7/2001 |

* cited by examiner

ORGANIZATION OF ARCHIVAL ELEMENTS FOR ANALOG/DIGITAL HYBRID DATA ON FILM

CROSS-REFERENCE TO RELATED APPLICATIONS

This application claims the benefit, under 35 U.S.C. §365 of International Application PCT/US2006/020191 filed May 24, 2006 which was published in accordance with PCT Article 21(2) on Jan. 4, 2007 in English and which claims the benefit of U.S. provisional patent application No. 60/694,611 filed Jun. 27, 2005.

FIELD OF THE INVENTION

The present invention generally relates to film media and, more particularly, to a system and method where a hybrid combination of analog frame images and digital data are organized on reels of film.

BACKGROUND OF THE INVENTION

The film industry has traditionally employed analog media for recording content. Analog media, such as 35 mm film, decays over time. The decay over time results in the degradation of image and sound quality. Long term storage of film media has been a difficult to solve problem. The situation of long-term archival has been partially solved in the analog world, however, using color separated versions of the film, which are recombined at provide the complete rendering of the film.

For example, three color component reels: yellow, cyan and magenta (YCM) are produced and separately stored, and recombined into a single reel when reproduction is needed. This is only a partial solution because it does not provide long term archival for sound, and also because more and more feature scenes are shot using visual effects techniques, causing the film to loose the key rendering information embedded in characters, like color and lighting parameters as add-ons to background plates mainly shot on negative film.

Therefore, a need exists for addressing long term degradation of film properties in image, sound and rendering information.

SUMMARY OF THE INVENTION

A system and method for archiving films includes dividing film content into N parts. Digitally storing metadata at least one of the N parts of the film that includes analog and digital data representing a record of the film on a single media for that part.

Another method for archiving films includes dividing an analog feature into N parts based on one of a length of film, run time and scenes and providing color component images for at least one of the N parts. For an N part, the color component images are incorporated for that part and digitally storing metadata for the corresponding part of the film that includes analog and digital data representing an entire record of the film on a single media for that part for archival storage.

A system for archiving films includes an editing device configured to divide a stored analog feature into N parts based on one of a length of film, run time and scenes. A joining device is configured to integrate color component images for at least one of the N parts with digital metadata for the corresponding part of the film that includes analog and digital data representing an entire record of the film on a single media for that part.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
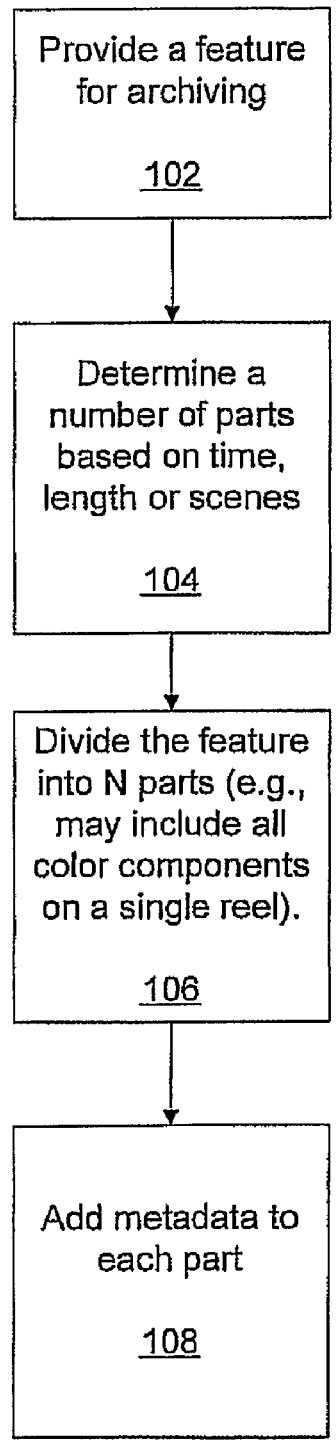
FIG. 1 is block/flow diagram of an exemplary method for archiving films in accordance with one embodiment.

It should be understood that the drawings are for purposes of illustrating the concepts of the invention and are not necessarily the only possible configuration for illustrating the invention.

DETAILED DESCRIPTION OF THE INVENTION

The present invention provides ways to store images (e.g., original negatives and shots or generated background, visual effects plates, final processed images, etc.) in analog form, while storing related metadata (e.g., sound, subtitling, captioning, edit decision lists (EDLs), color decision lists (CDLs), visual effects related information, etc.) on the same film but in digital form. In addition, it is preferable for the digital data to employ simple, stable, widely accepted and easy long-term recoverable standards.

Many advantages result in accordance with the present principles. For example, by providing digital information (metadata) for sound, etc. on the analog film, there is very little risk that the information related to one particular title is spread apart in various types of support equipment and totally different locations. Since the metadata is part of the film itself, issues of recovery are mitigated, and since the data is digital, it is easier to preserve in long term storage.

It is to be understood that the present invention is described in terms of a video recording media; however, the present invention is much broader and may include any analog/digital system, which is capable of storing data on media for long term preservation. In addition, the present invention is applicable to any recording method including recording data taken by telephone, set top boxes, computer, satellite links, etc. The present invention is described in terms of filmmaking applications; however, the concepts of the present invention may be extended to any recording process with long-term storage of magnetic tape, film or the like.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring now in specific detail to the drawings in which like reference numerals identify similar or identical elements throughout the several views, and initially to FIG. 1, an illustrative method is shown for implementing an exemplary embodiment of the present invention. In block 102, a feature to be archived is provided. The feature may already have been archived (color separated, etc.) or may be a new feature for archiving. In block 104, a determination of the number of parts, segments or pieces of the film is made. One present principle is to store all images and data necessary to recreate one continuous piece of a feature on one single medium, e.g., the film, whatever the time length of this single piece. For example, one 1,000 foot-reel should include not only images, but also sound, subtitle, color information, etc. for say about 10 minutes of a feature, or even for much less depending on the maximum capacity of the storage medium.

The determination of the number of parts or segments and the organization of data in the segments is preferably to be compatible in this example with the use of 35 mm 1000 foot-reels in accordance with current practices, which employ photochemical Intermediate Positive (IP=3 colors per frame) or YCM separation (black and white=1 color per frame) for archival storage. Consideration should also be given to future full digital (100% data on film) applications. After determination of the number of parts N, in block 106, the feature is divided into related parts for storage in the N parts. Each individual part is preferably the practical portion of all the movie data (e.g., images and metadata) that can be stored on one 1,000 foot-long reel of 35 mm film. In one example, the maximum value for N may be reached based on the film's storage capacity, e.g., 4K resolution format 4:4:4 16 bits, 24 fps cinemascope or super 35 mm can store e.g., about 75 Mbytes per digital image to archive. Potentially, several images per finished image of the feature will need to be stored to have a complete set of information for properly archiving the film. E.g., originated elements of a composited image with their correct color values plus the finished image, plus other metadata (sound, subtitling, etc.).

N may take any value between, e.g., about 12 (1 part per 1,000 foot-reel, for a current photochemical storage method if positive color stock is used), and a maximum of about 1,024 (that is, about 4 times 250, where 250 is the number of 1,000 foot-reels (35 mm, black and white) needed to store a 4K resolution movie with 1 Mbyte of data stored per frame). This maximum of 1,024 parts will probably never be used for practical reasons; but when the technology becomes available to reach higher data densities per storage medium frame (e.g., 5 MB/frame or even more), then the number of parts can again decrease significantly, and become more manageable, and thus closer to full digital storage. If 250 parts were identified with only one image stored per finished movie image, the average part length would be approximately about 30 seconds if N were 250 and the movie were about 2 hours in length (e.g. 2 hours/250).

Each of the N parts, may be of different size (e.g., do not have to be 1000 feet). Although the parts may be of the same length, the parts do not need to have the exact same timeline or frame count length, in order to accommodate scene changes, or other logical separation points, etc. For a 2 hour feature, a classical photochemical YCM separation process would count 12*3=36 parts (12 parts per reel, 3 reels). But the difference between traditional YCM practice and the method in accordance with the present principles includes that each film part will now preferably include all three color components on a single reel of film. This is not practical with the photochemical archival process. In other words, instead of each of three reels having a single color component; in accordance with one embodiment, a feature would include all three color components, and digital metadata on a single 10 minute (or other length of film) portion of the feature.

In block 108, metadata is added to each part of the film. The metadata can include any number of data types, including sound, color correction information edit lists, color lists, etc. The metadata may be added at the time of archiving the film by directly encoding the data on the film media itself. This may be performed by adding a header or tail segment to the film, or by digitally encoding the metadata on the film itself. Conventional recording equipment that encodes the digital information onto the film may be employed using a predetermined data organizational technique to perform the encoding.

The following example illustrates a decision process that defines how to optimize the method and what the needed number of parts is to archive a specific feature. In a hybrid archival solution in accordance with present principles, visual effects information of a feature may be included as digital metadata on the film. In one example, the visual effects (VFX) information may include 50% visual effect shots with an average of one background plate, one foreground plate and two characters per shot (e.g., 4 superposed images per shot). The total number of images to store would be 3.5 times as much as for what the finished movie image would have been alone (i.e., 7 times ½ of finished movie image). The factor of 7 may be represented by gathering the following images onto the archive:

50% non VFX original cinematic negative image (OCN)→ 1* ½ of finished movie

50% visual effects (VFX) related original images→4* ½ of finished movie (as per above)

100% finished movie itself after color correction and post-production (aggregation of VFX and non-VFX related final images)→2* ½ of finished movie.

Thus, the number of parts, in case of an IP based solution able to store 3 colors per frame of film, is expected to become 12 reels (expected length of the movie) *3.5 (from above)=42 parts. Compare this to the 3*42=126 parts in case of YCM based black & white separation for 3 color reels. The 126 parts would not be practical. Hence the IP based solution might be preferred to the YCM solution to allow for practical handling of the archived material.

Metadata descriptors (e.g., based on XML standards) and other data may be added to the film media.

Figure 2:
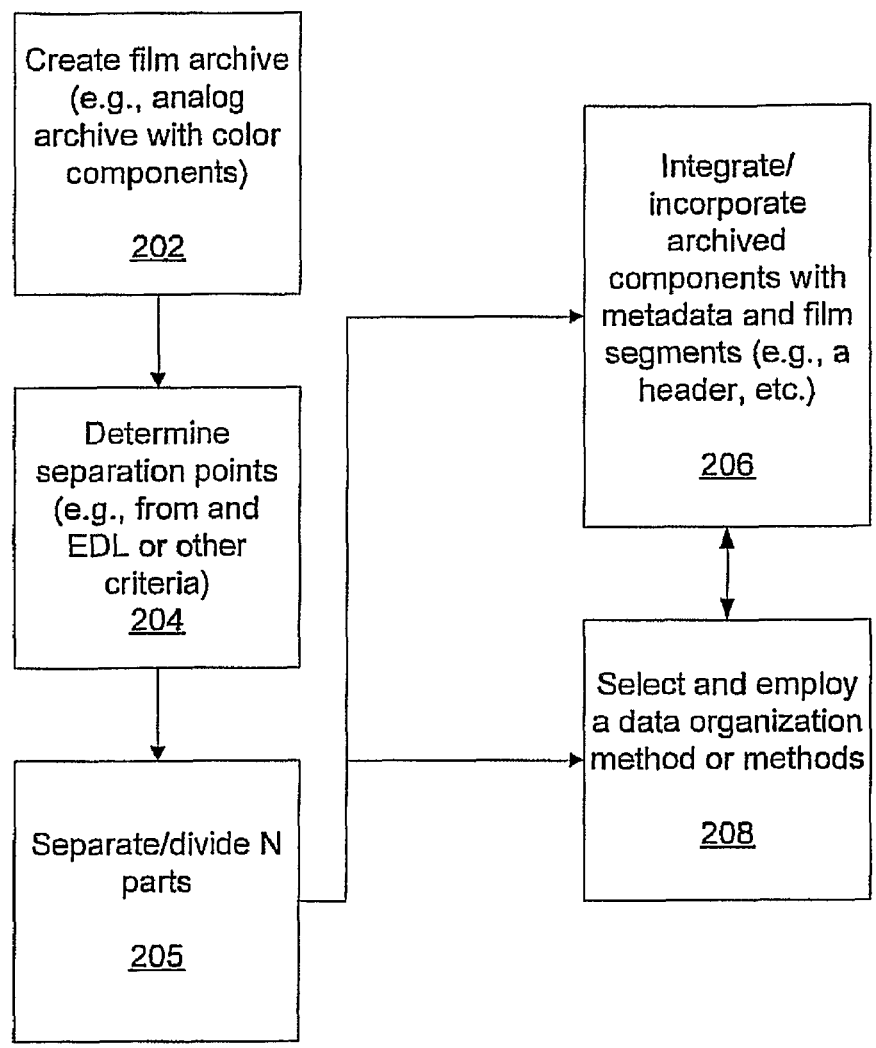
FIG. 2 is a block/flow diagram of another illustrative embodiment for archiving films.

Referring to FIG. 2, a method for archiving a film using a hybrid analog/digital approach in accordance with an exemplary embodiment is illustrated. In block 202, an archive is created of the film. This may include a color separation process known in the art (e.g., YCM or IP techniques) for separating visual images of the film into separate reels. In block 204, an edit decision list (EDL) or any other data is employed to determine appropriate separation points for the feature. The feature is separated into N parts (chunks) based on scene boundaries or other criteria in block 205. In block 206, the N parts are adjusted to include the reel information in the archive sets. Each part may include the finished image, metadata for that part, the color components, etc. for that part of the film.

The archive created in block 206 may include a plurality of parts from reels incorporated or integrated into a single film part. The new archived reel content may include one or more of a human readable head (e.g., in English), a machine-readable head (e.g., radio frequency identifier (RFID)), a sequence of hybrid archives and a human readable tail. The sequence of hybrid archives may include e.g., a sequences of images including color component images, metadata, VFX data, color correction data etc. to provide a complete record of the feature. The hybrid archive may include a sequence of images including the finished image, negatives, color components and any other combination of analog/digital information, as opposed to a single component image as in the prior art.

In one embodiment, the human readable header may have a total length of less than about 10 feet. The human readable head may include a data organization option (for example, N=1 if only a photochemical reel (color separated reel) and is provided with no sound, and N=1024 as an illustrative maximum). Hybrid archival number N can take any other value depending on the organizational option. The human readable head may include a value for N (number of parts in the feature); label information, a digital picture exchange (DPX) specification (this may be irrelevant for hybrid archiving), a channel coding specification (includes data organization and coding), an archive map. It could also include proxy images that can be used for search purposes or to create a visual identifier of a particular sequence of images (i.e. in one example at 144 images per proxy data frame, 50 proxy data frames are being created for 7,200 original pictures).

The label information (Label Info) may include a project title, a version, a copy number, archive date (date archive was created), a rights owner (e.g., lab access rights), archive part (e.g., part X of N parts), a number of frames, a corresponding film reel, unique material identifier (UMID), etc.

In block 208, data organization options may be selected. Note that blocks 206 and 208 may be performed in any order depending on the application and available information. Several data organization options may be individually selected and combined. The following description includes: 1) currently used methods for analog film archiving; 2) digital intermediates; and 3) Hybrid data organization in accordance with present principles.

1) Current analog film archival data organization (photochemical preservation):

YCM separation: One separate roll for each color component, 3 black & white rolls per original color reel. Sound is kept separately digitally on hard disk as Protools™. Stems on Mag in "WAV" form.

One Positive (IP) Archival: one to one, sound is kept separately digitally on hard disk as Protools™. One analog sound track is stored with one positive print.

2) Digital Intermediates:

a. YCM separation digital equivalent;

b. Separated Elements (SE) Negative (Separated Elements, stored on one single film strip: 1 frame Y, 1 frame C, 1 frame M, next color frame, etc.);

c. Intermediate Positive (IP) Archival digital equivalent d. Digital Intermediates (DI) Roadmap.

3) Hybrid solution: Analog plus Digital Intermediates with, e.g., metadata including visual effects information, sound, subtitling, color space, CDLs, EDLs, etc. attached to or integrated with the analog film.

Sequence of hybrid archives may include one or more of the following data organization methods. It should be understood that the following methods are for illustrative purposes. Those skilled in the art understand that other data organization methods may be employed in accordance with the present principles.

Digital data organization may include:

1) Sound track space used for digital data (this may be limited, probably less than 100 Kbytes/frame);

2) All digital data related frames following header are placed prior to analog images, and may be included on a shot by shot (or part by part) basis.

Analog images organization may include:

1) If analog images are stored in a SE mode (image by image), the order includes, per single shot or part:

a. Background plate Y, then C, then M;

b. Foreground plate Y, then C, the M;

c. Character 1: Y, then C. then M; and d. Character 2: Y, then C, then M.

2) Alternative is shot by shot (or part by part):

e. All background plate images, Y, then C, then M;

f. All foreground plate images, Y, then C, the M;

g. All character 1 images: Y, then C, then M; and h. All character 2 images: Y, then C, then M.

Figure 3:
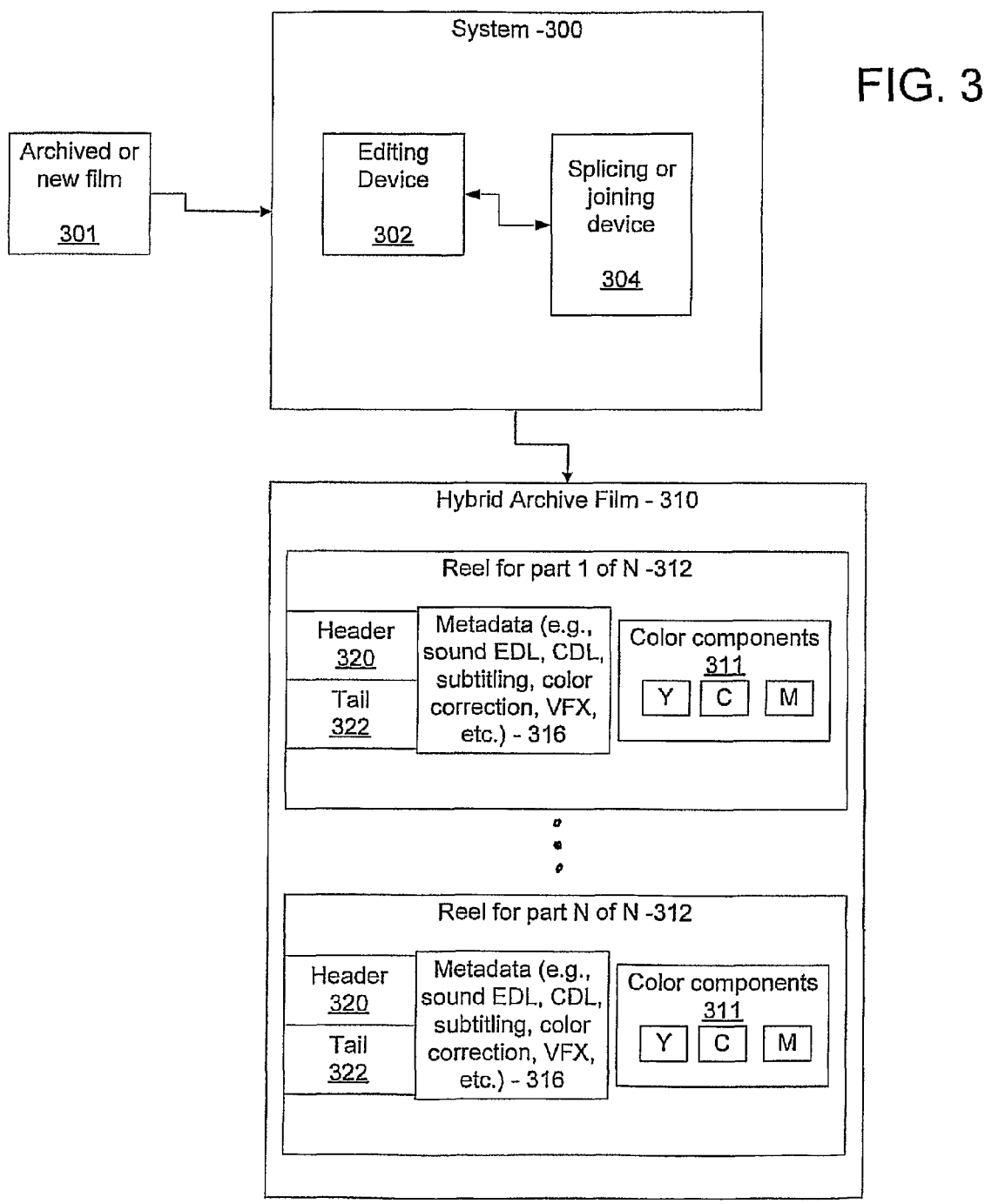
FIG. 3 is a block/flow diagram showing a system/method for archiving films in accordance with another illustrative embodiment.

Referring to FIG. 3, a system 300 for archiving films in accordance with present principles is illustratively shown.

System 300 may include a plurality of different film editing equipment. In the embodiment shown, an editing device 302 is configured to divide a stored analog feature 301, which may include an archived film or a new film, into N parts based on one of a length of film/run time, scenes, etc. The editing device 302 may automatically select division points, use director or other editing information (EDLs, etc.) or a user may manually select the division points to separate the feature. The separation or division points (for N parts) may be selected based on predetermined criteria, such as length of film and/or film run time, etc. A splicing or joining device 304 is configured to integrate analog and digital information in a hybrid method for archiving the feature. In one embodiment, this may include adding all of the color component images for each of the N parts with digital metadata for that part of the film such that the film includes a hybrid 310 of analog and digital data representing an entire record of the film on a single media for that part for archival storage.

A reel of film 312 may be produced for each part that includes a hybrid sequence of digital and analog data maintained on the reel in a separate area from the color component images. The hybrid combination would be organized in accordance with a data organization scheme selected in advance. Digital metadata 316 may include one or more of sound, subtitling, captioning, edit decision lists (EDLs), color spaces, color decision lists (CDLs), visual effects related information, and other film related information.

Preferably, the metadata 316 includes a complete set of information for that part of the film. In one embodiment, the archived feature 310 includes a plurality of reels 312 where each reel includes each of a plurality of color components portions Y, C, M corresponding to that part and metadata 316 corresponding to that part. The color components 311 and metadata 316 are included in accordance with a data organization method for that part such that all color components for that part and all metadata for that part are included on the same reel 312. Other portions of each reel may include headers 320 and tail portions 322 which may include additional information, and/or data for that reel 312.

Having described preferred embodiments for system and method for organization of archival elements for analog/digital hybrid data on film (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for archiving films, comprising:
dividing the film content into N parts;
digitally storing metadata for at least one N part of the film that includes analog and digital data representing a record of the film on a single media the at least one N part, wherein the single media includes each of a plurality of color component images associated with the at least one N part; and
wherein at least one color component reel is divided into parts and metadata is added to each of the component reels in accordance with a data organization such that all color components for that part and all metadata for that part are included on a same reel.

2. The method as recited in claim 1, wherein determining N parts of the film includes separating the film into equal segment lengths.

3. The method as recited in claim 1, further comprising determining an amount of metadata to be stored on the film media and dividing the metadata into parts and distributing the metadata over the N parts of the film in accordance with an available storage capacity of the N parts.

4. The method as recited in claim 1, further comprising adding a respective header to a plurality of N part, the header including metadata for each corresponding part.

5. The method as recited in claim 1, wherein digitally storing metadata includes digitally storing data for at least one of sound, subtitling, captioning, edit decision lists (EDLs), color spaces, color decision lists (CDLs), visual effects related information, other film related information.

6. The method as recited in claim 1, wherein providing a film reel including analog film content on a reel for archival storage includes separating a film into a plurality of color or shading component reels.

7. The method as recited in claim 6, wherein at least one component reel is divided into parts and metadata is added to each of the component reels in accordance with a data organization method.

8. The method as recited in claim 1, wherein at least one of the N parts includes a portion of a length of the film and further includes a final image, color components of the image, metadata for the length of film.

9. A method for archiving films, comprising:
dividing an analog feature into N parts based on one of a length of film, run time and scenes;
providing color component images for at least one of the N parts;
for the at least one N part, incorporating each of the color component images associated with the at least one N part and digitally storing metadata for the corresponding part of the film that includes analog and digital data representing a record of the film on a single media for the at least one N part for archival storage; and
wherein at least one color component reel is divided into parts and metadata is added to each of the component reels in accordance with a data organization such that all color components for that part and all metadata for that part are included on a same reel.

10. The method as recited in claim 9, wherein incorporating includes providing a reel for each part including a sequence of digital and analog data maintained on the reel in a separate area from the color component images.

11. The method as recited in claim 9, wherein storing metadata includes digitally storing data for at least one of sound, subtitling, captioning, edit decision lists (EDLs), color spaces, color decision lists (CDLs), visual effects related information, other film related information.

12. The method as recited in claim 9, wherein at least one of the N parts includes a portion of a length of the film and further includes a final image, color components of the image, and metadata for the length of film.

13. The method as recited in claim 9, wherein at least one of the N parts includes a portion of a length of the film and further includes a final image, color components of the image, and metadata for the length of film.

14. A system for archiving films, comprising:
an editing device configured to divide a stored analog feature into N parts based on one of a length of film, run time and scenes;
a joining device configured to integrate each of a plurality of color component images associated with at least one N part with digital metadata for the corresponding part of the film that includes analog and digital data representing an entire record of the film on a single media for the at least one N part for archival storage; and wherein the stored analog feature includes a plurality of color component reels wherein each color component reel is divided into parts corresponding to the N part and the metadata is divided into parts corresponding to the N parts, the color components and metadata being added to a same reel in accordance with a data organization such that all color components for that part and all metadata for that part are included on a same reel.

15. The system as recited in claim 14, wherein a reel of film for each part includes a hybrid sequence of digital and analog data maintained on the reel in a separate area from the color component images.

16. The system as recited in claim 14, wherein the digital metadata includes at least one of sound, subtitling, captioning, edit decision lists (EDLs), color spaces, color decision lists (CDLs), visual effects related information, other film related information.

17. The system as recited in claim 14, wherein at least one the N parts includes about 10 minutes of the analog feature.

18. The system as recited in claim 14, wherein the analog feature includes an edit decision list and the editing device employs the edit decision list to divide the analog feature into the N parts.

* * * * *